United States Patent

MacNiel

[15] 3,693,446
[45] Sept. 26, 1972

[54] DEPTH GAUGE
[72] Inventor: Douglas K. MacNiel, Costa Mesa, Calif.
[73] Assignee: U.S. Divers Co., Santa Ana, Calif.
[22] Filed: Aug. 11, 1970
[21] Appl. No.: 62,951

[52] U.S. Cl. ......................73/300, 73/411, 73/419
[51] Int. Cl..........G01f 23/20, G01l 7/16, G01l 7/02
[58] Field of Search...92/5 R, 169; 73/411, 419, 323, 73/431, 300; 220/55 AN

[56] References Cited

UNITED STATES PATENTS

| 3,280,628 | 10/1966 | Schloss | 73/419 X |
| 3,203,244 | 8/1965 | Alinari | 73/300 |
| 2,335,063 | 11/1943 | Hopkins | 73/431 |
| 3,424,007 | 1/1969 | Pasnak et al. | 73/419 X |
| 2,986,938 | 6/1961 | Grandstaff | 73/419 X |
| 3,357,394 | 12/1967 | Ingham et al. | 73/431 |
| 3,243,496 | 3/1966 | Silverstein | 73/431 X |
| 3,397,808 | 8/1968 | Jones | 73/323 X |

Primary Examiner—Louis R. Prince
Assistant Examiner—Daniel M. Yasich
Attorney—Gausewitz, Carr & Rothenberg

[57] ABSTRACT

The casing of a diver-held depth gauge comprises a liquid filled chamber in which is carried a pressure indicating mechanism comprising a Bourdon tube, dial and pointer. The chamber extends substantially across the entire casing and is sealed by a rigid plexiglass lens. The lens itself is resiliently mounted in the opening of the casing for limited sliding movement. In addition to the usual function of enabling visual access to the internal indicating mechanism, the lens transmits ambient external pressure to the confined internal liquid.

20 Claims, 2 Drawing Figures

PATENTED SEP 26 1972          3,693,446

INVENTOR.
DOUGLAS K. MACNIEL
BY
Lauserity & Cass
ATTORNEYS.

DEPTH GAUGE

BACKGROUND OF THE INVENTION

1. Field of the Invention

The present invention relates to pressure meters and more particularly concerns a diver-held depth gauge of an improved construction that provides maximized protection for internal mechanisms and avoids external exposure of sensitive operating parts.

2. Description of Prior Art

Depth gauges, particularly those that are readily portable and designed to be worn by a diver, generally employ an aneroid mechanism or conventional Bourdon tube with suitable linkage and an indicator calibrated to provide a display of depth in feet or meters as a function of ambient water pressure. A number of devices of this type provide direct access of the ambient water to the internal mechanism of the gauge. Typical of such devices are the instruments described in U.S. Pat. No. 3,187,572 to P. W. Harland and in U.S. Pat. No. 3,370,470 to G. Neugebauer. Such arrangements are subject to severe corrosion problems. The contaminating effects of contacting sea water and the particles or debris that may be carried by the water also degrade operation. Sea water quickly interferes with and eventually prevents operation of the gauge for accurate measurement.

To avoid such problems and to provide protection for delicate pressure sensitive mechanisms, several different arrangements have been suggested for sealing the pressure sensitive mechanism within a fluid filled chamber and transmitting ambient external pressure to the confined fluid by means of a flexible diaphragm. Arrangements of this type are shown in the U.S. Pats. to R. J. Cerny, No. 2,986,038, T. Stewart, No. 2,935,873, and the U.S. Pats. to C. Alinari, Nos. 3,121,333 and 3,203,244. In each of these gauges, a relatively incompressible fluid not only transmits pressure to the sealed pressure sensitive Bourdon tube, but also provides for damping of the motion of moving parts and cushioning against shock.

Prior devices, particularly those providing for a wrist-mounted instrument, include a transparent sealed lens on one side of a casing to provide visibility of the internal indicating mechanism. On the other side of the casing, generally on the portion that is adjacent the wearer's wrist, there is arranged a flexible diaphragm adapted to respond to ambient water pressure. The diaphragm flexes to transmit pressure to the confined fluid and thereby to the pressure sensitive mechanism within the casing. The requirement of a diaphragm that is suitably flexible is in direct conflict with other requirements of devices of this kind, namely the requirements for ruggedness and the ability to withstand hard wear and rough usage. For this reason, gauges such as those shown by Stewart, Cerny, and Alinari all must provide additional relatively complex and expensive arrangements for protecting the pressure sensitive diaphragm.

Thus, a rigid guard or screen must be mounted to the casing over the diaphragm and suitable passages or ports formed in or about the guard to admit ambient water. Not only are these guard devices expensive and difficult to manufacture, but the relatively restricted ports or openings therein are themselves subject to becoming clogged or otherwise inoperative to thereby introduce still further unreliability.

Because a pressure responsive diaphragm operates by flexing through complex curvatures, changing from an initial planar configuration, volume changes within the sealed pressure chamber are not linear with respect to external pressure changes. Thus, the diaphragm introduces non-linearity of the reading or requires a compensatory non-linear calibration of the dial. In either case, errors are present and compounded as the diaphragm ages and its flexibility changes.

Furthermore, the diaphragm, because of its relatively fragile nature, is generally formed with a considerably smaller extent than the extent of the entire meter, so that its operative surface area is relatively limited.

Accordingly, it is an object of the present invention to provide a depth gauge in which the indicating mechanism is entirely mounted in a sealed chamber having an improved arrangement for transmitting pressure thereto.

SUMMARY OF THE INVENTION

In carrying out principles of the invention in accordance with a preferred embodiment thereof, a housing defining a chamber has an opening communicating with the chamber and is provided with a rigid closure member that is resiliently mounted in the opening in sealing relation to the chamber for limited motion in response to pressure exerted upon the closure member. A liquid is sealed within the chamber together with means for indicating pressure of the liquid. An additional feature of the invention is implemented by making the rigid closure member of a transparent material such as a relatively thick plexiglass disc that seals the opening and is resiliently mounted therein for a limited sliding motion by means of a peripheral O-ring.

DETAILED DESCRIPTION

Figure 1:
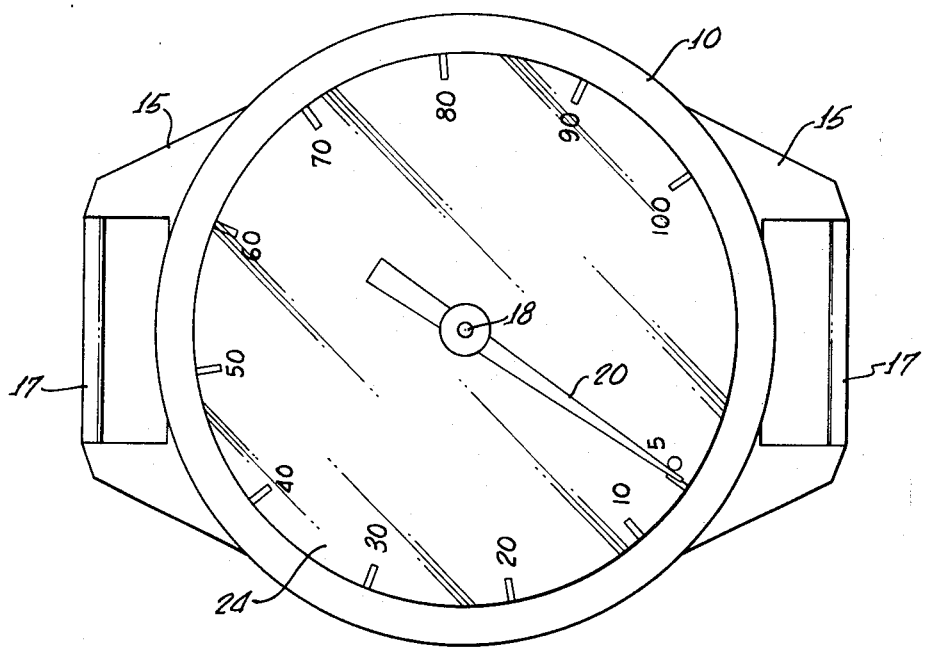
FIG. 1 is a plan view of a pressure responsive instrument constructed in accordance with principles of this invention.
Figure 2:
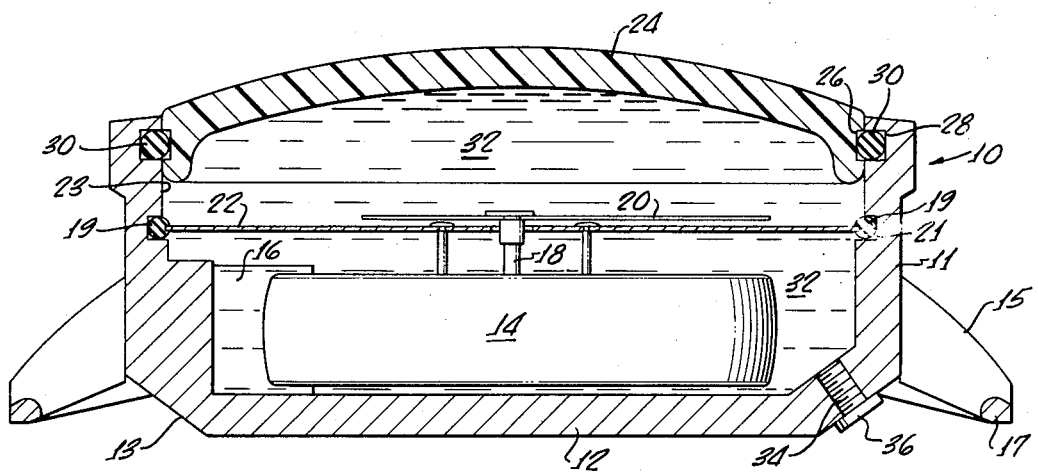
FIG. 2 is a cross-section of the instrument of FIG. 1.

As illustrated in FIG. 2, a substantially rigid housing 10 is formed as a shallow cup or, in effect, as a cylindrical section having an axial length considerably less than its diameter. Housing 10, which is preferably made of a suitable corrosion resistant metal such as aluminum or brass, or of a relatively rigid corrosion resistant plastic, has a bottom or fixed end member 12, upstanding side walls 11 and beveled corners 13, all integrally formed to thereby define an internal chamber for mounting a pressure sensitive mechanism.

Housing 10 is also provided with integral diametrically opposed extending flanges or lugs 15 that carry bars 17. The latter are spaced from the body of the housing to enable a wrist band or strap (not shown) to be secured to the gauge.

Securely mounted to the housing 10 and totally within the chamber therein is an indicating mechanism comprising a Bourdon tube 14. The Bourdon tube 14 is a substantially conventional device and may be evacuated and sealed, or filled with air or other gas under atmospheric pressure and then sealed.

One end of the tube 14 is fixedly attached to a support 16 positioned centrally of the housing and extending diametrically across the housing from one edge thereof to the center. Attached to the free end of the Bourdon tube 14 is a conventional linkage and dial operating mechanism (not shown) that is arranged to rotate a pointer 20. The pointer is carried by a shaft 18 journaled in the fixed support 16.

Rigidly affixed to the support 16 is a dial face 22 bearing suitable indicia that enable visual readout of the angular position of the pointer 20.

Dial 22 has the edges thereof inserted in a resilient circumferential tube 19. The latter is formed with a continuous slot that resiliently receives and frictionally engages the edge of the dial. To allow liquid communication across the dial, tube 19 extends less than a full 360° around the dial.

Side wall 11 of the housing is formed with an annular groove 21 that receives and securely retains the resilient tube 19 together with the dial 22. By this means, the entire pressure sensitive, indicating assembly is mounted to and carried by the housing.

To facilitate assembly, the inner diameter of housing 10 below groove 21 is made substantially equal to the diameter of dial 22 whereby the latter (with tube thereon) may not be inadvertently positioned below the groove. In effect, a shoulder is provided upon which the dial tube 19 is seated. The inner diameter 23 of the housing above the groove is slightly larger to allow insertion of the dial and tube.

The opening of the housing is substantially filled and closed by a rigid closure member 24. Closure member 24 is a relatively thick plate of transparent material such as glass or transparent plastic and has a relatively shallow peripheral annular groove 26 formed in its edge. A relatively deeper mating groove 28 is formed in the larger diameter portion 23 of the wall of the cylindrical housing section adjacent the chamber opening. A resilient O-ring 30, formed of elastomeric material, is captured within and confined by the mating grooves 26, 28, to thereby resiliently secure and seal the closure member 24 to the housing 10 within the opening thereof. The edge of member 24 is a close but free sliding fit upon the surface of the larger diameter portion 23 as will be described below. To afford some magnification the closure member may be made slightly convex.

A substantially incompressible liquid 32, such as ethylene glycol or an equivalent viscous and incompressible oil, completely fills the chamber within the housing 10 and is sealed therein by the lens or closure member 24. Liquid 32 protects the sensitive pressure responsive mechanism from corrosive effects of the salt water or other ambient environment and achieves a uniform application of pressure to the entire exterior surface of the Bourdon tube 14. As is well known, a viscous liquid such as oil, provides a damping of vibration induced motion and also protects sensitive parts from external shock.

Housing 10 is provided with an aperture 34 in which is threadedly engaged a removable cap or plug 36 that is sealed to the housing.

For optimum operation of the described gauge, the chamber is completely filled with the confined liquid and all bubbles of air or gas are eliminated. For this reason, the plug 36 is provided to enable careful filling of the previously assembled structure including pressure sensitive mechanism and chamber sealing closure member 24. Having carefully filled the chamber so as to prevent formation or entrapment of bubbles of air or gas, the plug 36 may then be inserted within the aperture 34 and sealed and secured therein. Thus, assembly of the instrument may be completed without any disturbance which may introduce bubbles into the interior of the housing 10.

If deemed necessary or desirable to further insure a bubble-free liquid within the casing, the entire assembly except for the wrist strap is assembled while immersed in a body of the same liquid. The dial 22 and tube 19 (together with the Bourdon tube mechanism carried thereby) are first positioned to cause the tube 19 to be resiliently secured in groove 21. O-ring 30 is located in groove 28, the housing is inverted, and lens closure member 24 is then pressed into place whereby the O-ring 30 is forced into groove 26 of the lens. During the latter step, liquid within the housing is displaced through aperture 34 to provide a "bleeding" operation that ensures removal of entrapped gas.

The plug 36 may be removed if necessary for refilling of the chamber as may be required upon repair or replacement of various parts of the gauge.

It will be seen that the closure member 24 provides a pressure transmitting member having an externally wetted surface, namely a surface in contact with the ambient water, of maximized dimension with respect to the overall size of the instrument. This closure member performs several different functions when arranged and constructed as described above. Acting as a transparent lens, it provides visual access to the dial scale and pointer. Being slidably mounted for limited motion, without flexure, toward and away from the chamber confining the incompressible fluid 32 and pressure sensitive mechanism, the closure member acts as a pressure transmitting member. It thus additionally performs the usual function of the flexible diaphragms employed in prior devices. Further, having a substantial thickness and being rigid and rugged, the closure member protects the sensitive mechanism within the housing.

Sealing O-ring 30 also performs several functions in the described arrangement. First, as is common for such a device, it provides a pressure and liquid seal for the housing chamber, confining the liquid 32 therein and preventing leakage. Concomitantly, the O-ring 30 provides a resilient mounting for the rigid closure member 24 that enables a limited sliding motion thereof to and from the housing chamber in accordance with ambient pressure variations.

Considering the relatively shallow depth of the cylindrical housing 10 as compared with its large diameter, it will be readily seen that only a small displacement of the closure member 24 axially of the cylindrical housing 10, will achieve a relatively large change in the volume of the sealed chamber within the housing. The sliding motion of the lens is provided by a limited torsional or rolling deformation of the O-ring 30. Any such volume change within the housing acts directly upon the elastic Bourdon tube.

As mentioned above, the flexing action of the conventional diaphragm may be a source of unacceptable errors in a precision measuring instrument. The described closure member, on the other hand, completely avoids this type of error. Member 24 is sufficiently thick and rigid to avoid any flexing. Thus, it slides as a unit through a limited distance. This arrangement provides volume changes within the chamber that are directly proportional to external pressure changes through the range of motion of closure member. Even the relatively limited slidable axial motion of lens 24 that is afforded by the resilient O-ring mounting thereof will provide a relatively large range of pressure readings. For example, lens 24 travels but 0.017 inch, in going from depths of 0 to 300 feet, in order to provide a full scale travel of pointer 20 of a common Bourdon tube pressure sensitive mechanism. Thus, the overall dimensions of the gauge assembly may be optimized. The gauge may have a relatively large diameter and a relatively small axial extent for convenient attachment to a wrist.

It will be seen that the described oil-filled depth gauge provides an improved and simplified arrangement that affords significant economies in manufacture and yet entails no compromise in accuracy or operation. No special screens, guards, or apertures therefor need be designed or built. The sealing O-ring commonly employed for the lens concomitantly provides a resilient mounting for the lens so that the usual flexible diaphragm of prior devices is wholly eliminated without loss of its function. Not only is the previous function of the prior art diaphragm retained, but such function is actually enhanced by the described arrangement which enables use of a pressure transmitting member, lens 24, of increased linearity, and of maximized size and ruggedness needing no further protection.

The foregoing detailed description is to be clearly understood as given by way of illustration and example only, the spirit and scope of this invention being limited solely by the appended claims.

What is claimed is:

1. A pressure responsive instrument, comprising:
    a rigid housing defining a chamber,
        said housing having an opening therein communicating with said chamber,
    a rigid transparent pressure responsive closure member mounted in said opening for limited movement toward and away from said chamber,
    a liquid in said chamber and substantially filling the same,
    means for sealing said closure member in said opening throughout its limited range of movement, to seal said liquid within said chamber, and
    means disposed in said chamber for indicating pressure of said liquid,
        whereby pressure exerted upon said closure member is transmitted to said liquid and visibly indicated by said indicating means through said rigid transparent pressure responsive closure member.

2. The instrument of claim 1 wherein said sealing means includes means for mounting said closure member to said housing for limited sliding motion toward and away from said chamber.

3. A depth gauge, comprising:
    a housing defining a chamber,
        said housing having an opening therein communicating with said chamber,
    a rigid closure member resiliently mounted in said opening in sealing relation to said housing for limited motion toward and away from said chamber in response to pressure exerted upon said closure member,
    said closure member being transparent,
    a liquid sealed within said chamber, and
    indicating means disposed within said chamber for indicating the pressure of said liquid,
        said indicating means being visible through said closure member.

4. The gauge of claim 3 wherein said indicating means comprises
    a Bourdon tube mounted in said chamber,
    a dial disposed between said Bourdon tube and said closure member and having a diameter substantially equal to the diameter of said chamber, and
    a pointer operatively connected with the Bourdon tube for movement over said dial.

5. The gauge of claim 3 wherein said chamber is generally cylindrical and has an axial length less than its diameter, wherein a fixed end member is sealed to said housing at one end of said chamber, and wherein said opening is substantially co-extensive with the other end of said chamber.

6. The gauge of claim 5 wherein said housing has an annular groove at said other end of said chamber, wherein said closure member has an annular groove in a peripheral edge thereof, and wherein said closure member is mounted in said opening by means of an O-ring confined within both said grooves, whereby said O-ring is deformed within said grooves as said closure member slides axially of said cylindrical section.

7. The gauge of claim 6 wherein said housing includes
    an aperture therein for communication with said chamber, and
    a plug removably sealed in said aperture.

8. The depth gauge of claim 3 wherein said closure member is mounted for limited sliding motion toward and away from said chamber.

9. A pressure responsive instrument comprising:
    a rigid housing defining a chamber,
        said housing having an opening therein communicating with said chamber,
    a rigid pressure responsive closure member formed of a transparent plate substantially completely filling said opening, said transparent plate being mounted in said opening for limited movement toward and away from said chamber,
    a liquid in said chamber and substantially filling the same,
    means for sealing said transparent plate in said opening to seal said liquid within said chamber, said sealing means comprising:
        a flexible element interposed in sealing relationship between the periphery of said plate and the portion of said housing encompassing said opening, and
    means disposed in said chamber for indicating pressure of said liquid,
        whereby pressure exerted upon said transparent plate is transmitted thereby to said liquid and visibly indicated by said indicating means through said transparent plate.

10. A pressure responsive instrument, comprising:

a rigid housing defining a chamber,
   said housing having an opening therein communicating with said chamber,
a rigid closure member mounted in said opening for limited movement toward and away from said chamber,
   said closure member being a transparent plate substantially completely filling said opening,
a liquid in said chamber,
means for sealing said closure member in said opening to seal said liquid within said chamber, said sealing means comprising:
   an O-ring interposed in sealing relationship between the periphery of said plate and the portion of said housing encompassing said opening, the periphery of said plate and said encompassing portion of said housing being formed with mating grooves, said O-ring being mounted in sealing relation in both said grooves, and
means for indicating the pressure of said liquid,
   whereby pressure exerted upon said said closure member is transmitted to said liquid and indicated by said indicating means, said indicating means being visible through said transparent plate.

11. The instrument of claim 10 wherein said housing is formed with a third groove positioned inwardly of said opening relative to said closure member, and wherein said means for indicating pressure comprises a dial, and
   a slotted tube resiliently retained in said third groove, said dial having a peripheral edge portion mounted within the slot of said tube.

12. A depth gauge, comprising:
a housing defining a chamber,
   said housing having an opening therein communicating with said chamber,
a rigid closure member resiliently mounted in said opening in sealing relation to said housing for limited motion toward and away from said chamber in response to pressure exerted upon said closure member,
   said closure member being transparent,
a liquid sealed within said chamber, and
indicating means disposed within said chamber for indicating the pressure of said liquid,
   said indicating means being visible through said closure member,
   said indicating means comprising:
      a Bourdon tube mounted in said chamber,
      a dial disposed between said Bourdon tube and said closure member and having a diameter substantially equal to the diameter of said chamber, and
      a pointer operatively connected with the Bourdon tube for movement over said dial,
said housing being formed with an annular groove, and a slotted tube substantially circumscribing and retaining a peripheral edge portion of said dial in the slot thereof, said slotted tube being resiliently confined within said groove.

13. A depth gauge, comprising:
a housing defining a chamber,
   said housing having an opening therein communicating with and substantially coextensive with one end of said chamber,
   said housing being generally cylindrical and having an axial length less than its diameter,
a fixed end member sealed to said housing at the other end of said chamber,
a rigid transparent pressure responsive closure member resiliently mounted in said opening in sealing relation to said housing for a limited motion toward and away from said chamber in response to pressure exerted upon said closure member,
a liquid sealed within and filling said chamber and in full contact with said rigid transparent closure member, and
indicating means disposed within said chamber and visible through said rigid transparent pressure responsive closure member for indicating pressure of said liquid.

14. An underwater depth gauge comprising:
a rigid housing defining a chamber,
   said housing having an opening therein communicating with said chamber,
a rigid transparent pressure responsive closure member mounted in said opening for limited movement toward and away from said chamber,
a liquid in said chamber,
means for securing and sealing said closure member to and within said opening to seal said liquid within said chamber, to retain said closure member in a predetermined position when it is subjected to substantially atmospheric pressure, and to permit limited movement thereof when it is subjected to the greater pressure of a body of water in which the gauge is submerged,
   said securing and sealing means comprising means circumscribing the periphery of said closure member and secured throughout its extent in sealing relation both to said closure member and to the opening of said chamber, and
means within said chamber and visible through said rigid transparent closure member for indicating pressure of said liquid,
   whereby pressure exerted upon said closure member is transmitted to said liquid and visibly displayed by said indicating means through said transparent pressure responsive closure member.

15. The instrument of claim 14 wherein said opening and the edge of said closure member are formed with mutually facing and mating peripheral grooves, and wherein said circumscribing means comprises an elastic toroid captured within both of said mating grooves.

16. A depth gauge comprising:
a housing formed as a shallow cup open at one end substantially across its entire extent,
pressure indicating means mounted within the housing, and visible through said open end,
a liquid within and substantially filling said housing and completely immersing said indicating means therein,
a rigid transparent pressure responsive closure member substantially filling the open end of said housing and having its inner surface in contact with said liquid, said rigid transparent closure member being mounted to said housing for limited sliding motion toward and away from the interior of the housing so as to transmit external pressure to said liquid over substantially the entire extent of the housing open end, and means for sealing said rigid transparent pressure responsive closure member to and within the open end of said housing so as to seal said liquid and indicating means within said housing.

17. The depth gauge of claim 16 wherein said sealing means comprises a set of mating grooves in said housing and in the peripheral edge of said rigid transparent pressure responsive closure member, and an elastomeric sealing element captured within and confined by the mating grooves.

18. A depth gauge for strapping on the wrist of a skin diver, which comprises:

a shallow, cup-shaped, substantially rigid housing which is open at the upper end thereof, a dial provided in generally parallel relationship to said open upper end of said housing, an indicator mounted within said housing and movable to different positions relative to said dial, at least part of said indicator being visible through said open upper end of said housing, a Bourdon tube mounted within said housing and operatively connected with said indicator, whereby the pressure sensed by said Bourdon tube will effect a corresponding positioning of said indicator relative to said dial, a substantially incompressible liquid substantially completely filling said housing and immersing said Bourdon tube and said indicator, a substantially rigid member disposed at the open upper end of said housing to confine said liquid therein, the periphery of said member being adjacent said open upper end of said housing, at least parts of said member being transparent whereby to permit the diver to look through said member and see said indicator, and resilient sealing and motion-permitting means provided between the periphery of said member and said open upper end of said housing, said last-named means effecting sealing of said member relative to said housing whereby to prevent either ingress of sea water into said housing or egress of said liquid from said housing, said last-named means permitting a small degree of movement of said member toward the bottom of said housing in response to a descent by the diver into the sea, said small degree of movement effecting an increase in the pressure of said liquid within said housing to thus cause said Bourdon tube to move said indicator relative to said dial.

19. A depth gauge comprising:

a housing defining a chamber, said housing having an opening therein communicating with and substantially co-extensive with one end of said chamber, said housing being generally cylindrical and having an axial length less than its diameter, a fixed end member sealed to said housing at the other end of said chamber, a rigid pressure responsive closure member mounted in said opening in sealing relation to said housing for limited motion toward and away from said chamber in response to pressure exerted upon said closure member, first and second mating grooves formed respectively in the periphery of said closure member and in the portion of said housing that encompasses said opening, an O-ring captured in both said grooves and interposed in sealing relation between the periphery of said closure member and the portion of said housing that encompasses said opening, a liquid sealed within said chamber, and indicating means disposed within said chamber for indicating pressure of said liquid, said rigid pressure responsive closure member being transparent whereby said indicating means is visible through said transparent closure member.

20. A depth gauge for a skin diver comprising:

a rigid housing having a side wall and first and second ends, said housing defining a chamber that extends substantially throughout the entire housing, said housing having an opening therein extending substantially across one end of said chamber, a fixed end member sealed to said housing at the other end of said chamber, indicator means mounted within said chamber and movable to different positions to provide a visual display of pressure, a Bourdon tube mounted within said chamber and operatively connected with said indicator means, whereby pressure exerted upon said Bourdon tube will effect a corresponding display of said indicator means, a substantially incompressible liquid substantially completely filling said chamber and immersing said Bourdon tube and said indicator means, a rigid pressure responsive closure member positioned in said opening for limited movement toward and away from said chamber, said rigid closure member having its inner face in substantially full contact with said liquid, at least part of one of said members being transparent whereby to permit the diver to look through said one member and see said indicator means, means for mounting said rigid closure member to said housing for said limited motion, and for resiliently securing and sealing said rigid closure member to and within said opening to resiliently retain said closure member in position and to seal said liquid within said chamber, said mounting, securing and sealing means comprising a resilient element continuously interconnected to and between the periphery of said rigid closure member and the surrounding portion of said chamber within said opening, said resilient element being secured throughout its extent in sealing relation to said rigid closure member and to the opening of said chamber, whereby an increase in pressure exerted upon said closure member is transmitted to said liquid over substantially all of said closure member face by limited motion of said closure member toward said chamber, to thereby compress said Bourdon tube and move said indicator means to provide a display of pressure visible through said one transparent member part, and whereby said closure member is returned to an initial position when said increase in pressure is no longer exerted upon said closure member.

* * * * *